(12) United States Patent
Adams et al.

(10) Patent No.: US 8,151,518 B2
(45) Date of Patent: Apr. 10, 2012

(54) VERTICALLY INTEGRATED GREENHOUSE

(75) Inventors: Zakery Ward Adams, Brooklyn, NY (US); Theodore Caplow, Jr., New York, NY (US)

(73) Assignee: New York Sun Works, New York, NY (US)

( * ) Notice: Subject to any disclaimer, the term of this patent is extended or adjusted under 35 U.S.C. 154(b) by 323 days.

(21) Appl. No.: 12/483,009

(22) Filed: Jun. 11, 2009

(65) Prior Publication Data

US 2009/0307973 A1    Dec. 17, 2009

Related U.S. Application Data

(60) Provisional application No. 61/073,303, filed on Jun. 17, 2008.

(51) Int. Cl.
*A01G 9/02* (2006.01)

(52) U.S. Cl. .......................................................... 47/82

(58) Field of Classification Search .................. 47/59 R, 47/62 R, 62 N, 17, 39, 65, 65.5, 66.6, 66.7, 47/67, 82, 83
See application file for complete search history.

(56) References Cited

U.S. PATENT DOCUMENTS

| | | | | | |
|---|---|---|---|---|---|
| 3,667,157 | A | * | 6/1972 | Longhini | 47/59 R |
| 4,068,405 | A | * | 1/1978 | Campbell et al. | 47/65 |
| 4,128,307 | A | * | 12/1978 | Badertscher et al. | 359/596 |
| 4,255,896 | A | | 3/1981 | Carl | |
| 4,255,897 | A | * | 3/1981 | Ruthner | 47/65 |
| 4,713,909 | A | * | 12/1987 | Roper et al. | 47/17 |
| 2004/0111965 | A1 | * | 6/2004 | Agius | 47/62 R |
| 2009/0307973 | A1 | * | 12/2009 | Adams et al. | 47/62 C |

OTHER PUBLICATIONS

Kiss + Cathcart, Vertically Integrated Greenhouse, Oct. 2007; (Citation "C" of IDS filed Dec. 29, 2009).*
Stec et al., "Modelling the Double Skin Façade with Plants", Energy and Buildings, 37, (2005) 419-427.
"Vertically Integrated Greenhouse", A Submission to the Buckminster Fuller Institute Competition, Oct. 2007.
"A&B Hydroponics International Pty Ltd", http://www.abhydroponics.com.au/index.htm, retrieved Nov. 19, 2009.
Michael Wigginton & Battle McCarthy, "Environmental Second Skin Systems", Jun. 1, 2000.
Coliseum Hydroponic Growing System, http://www.bghydro.com, retrieved Nov. 19, 2009.
Caplow et al., "Vertically Integrated Greenhouse: Realizing the Ecological Benefits of Urban Food Production", Ecocity World Summit 2008 Proceedings.
Streicher, "Bestfaçade, Best Practice for Double Skin Façades", Nov. 30, 2005.
Hydroponic Garden Kits, http://www.growny.com, retrieved Nov. 19, 2009.
Organa Gardens International Inc.—Sustainable Vertical Garden Systems, http://www.organagardens.com, retrieved Nov. 19, 2009.
"Green Facts", http://www.cafehabana.com/pdfs/GreenFacts.pdf, retrieved Dec. 29, 2009.

* cited by examiner

*Primary Examiner* — Frank T Palo
(74) *Attorney, Agent, or Firm* — Foley & Lardner LLP

(57) ABSTRACT

A vertically-integrated greenhouse for growing plants in suspended trays. The design is particularly well-suited for installation in a double-skin façade of a building, or in an interior atrium, lobby, or similar structure. In addition to producing food, plants can reduce building maintenance costs by providing shade, air treatment, and evaporative cooling to building occupants. The vertically-integrated greenhouse involves the use of a dynamic movable array of plant trays as a mechanical shading device. The spacings and arrangements of the trays in the tray suspension system can be adjusted on both a diurnal basis and a seasonal basis to maximize plant light capture and building shading, thereby maximizing crop yield and building energy savings, or for esthetic considerations.

20 Claims, 10 Drawing Sheets

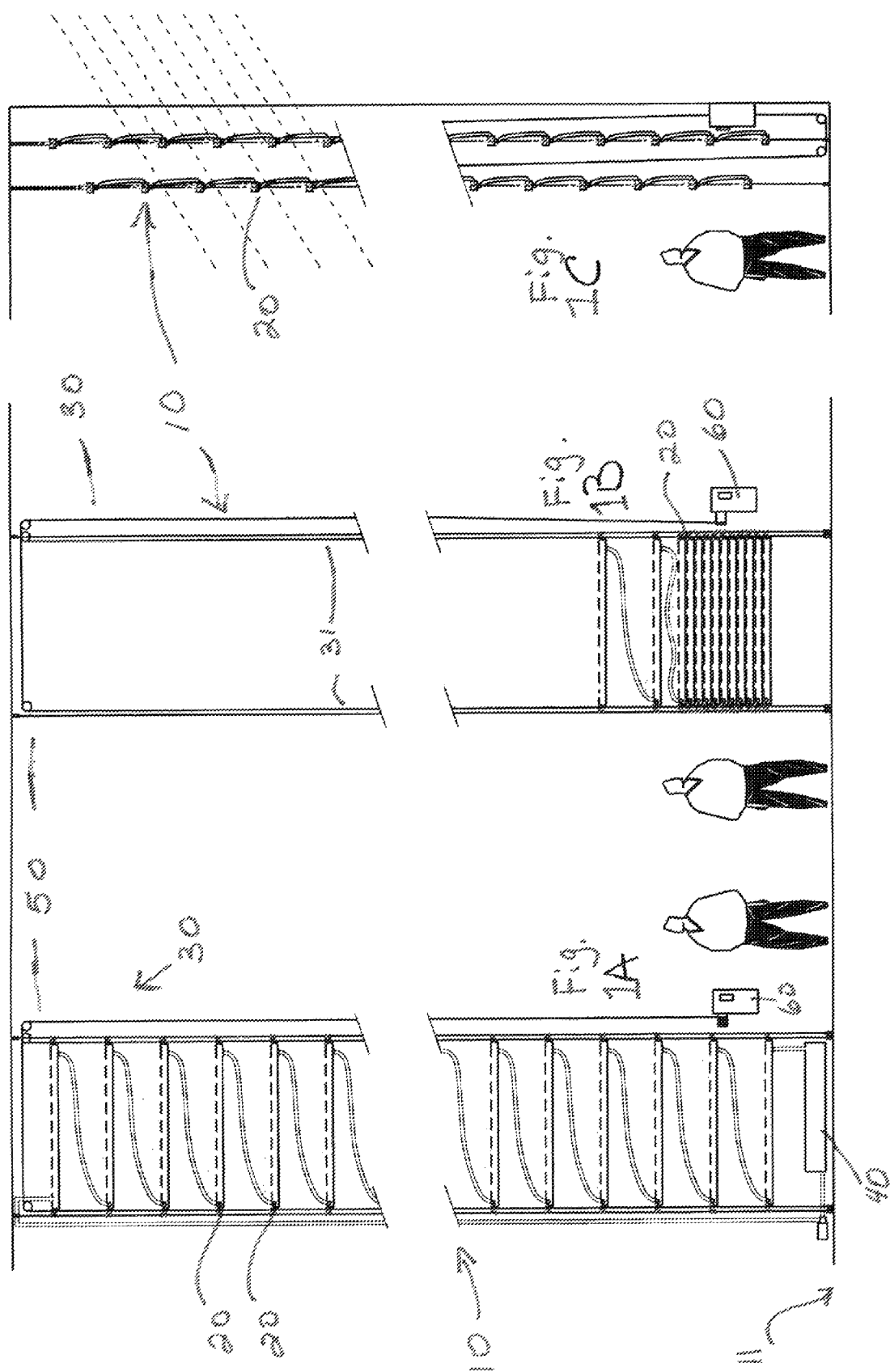

VARIABLE
REGISTRATION
OF COLUMNS
TRACKS SUN
DIURNALLY

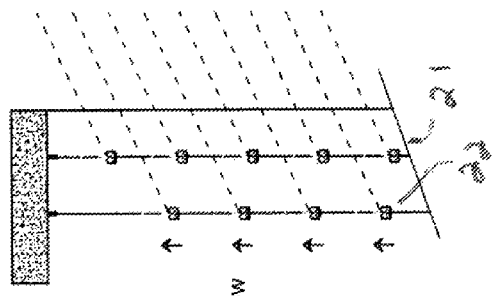

Fig. 2A

At the middle of the day, back row slides to catch solar angle of 45 deg

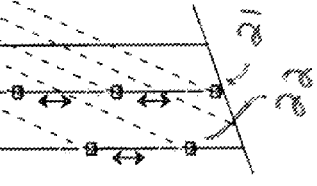

Fig. 2B

Early and late in the day, back row slides to catch solar angle of 25 deg

VARIABLE
SPACING
OF TRAYS
TRACKS SUN
SEASONALLY

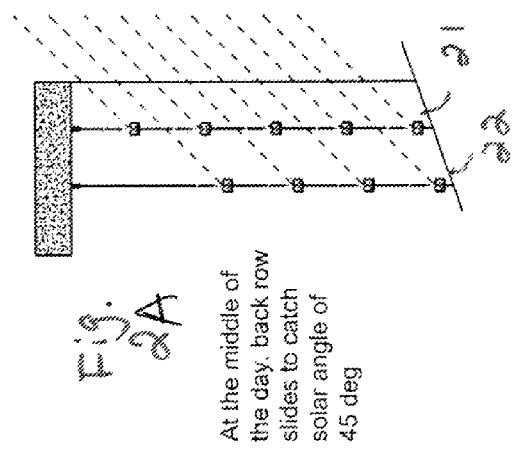

Fig. 2C

In winter, spacing is adjusted to optimize light capture for a solar angle of 20 deg

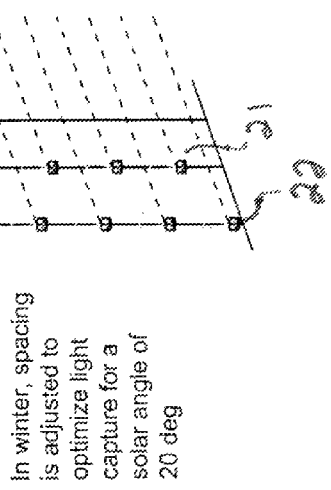

Fig. 2D

In summer, spacing is adjusted to optimize light capture for a solar angle of 65 deg

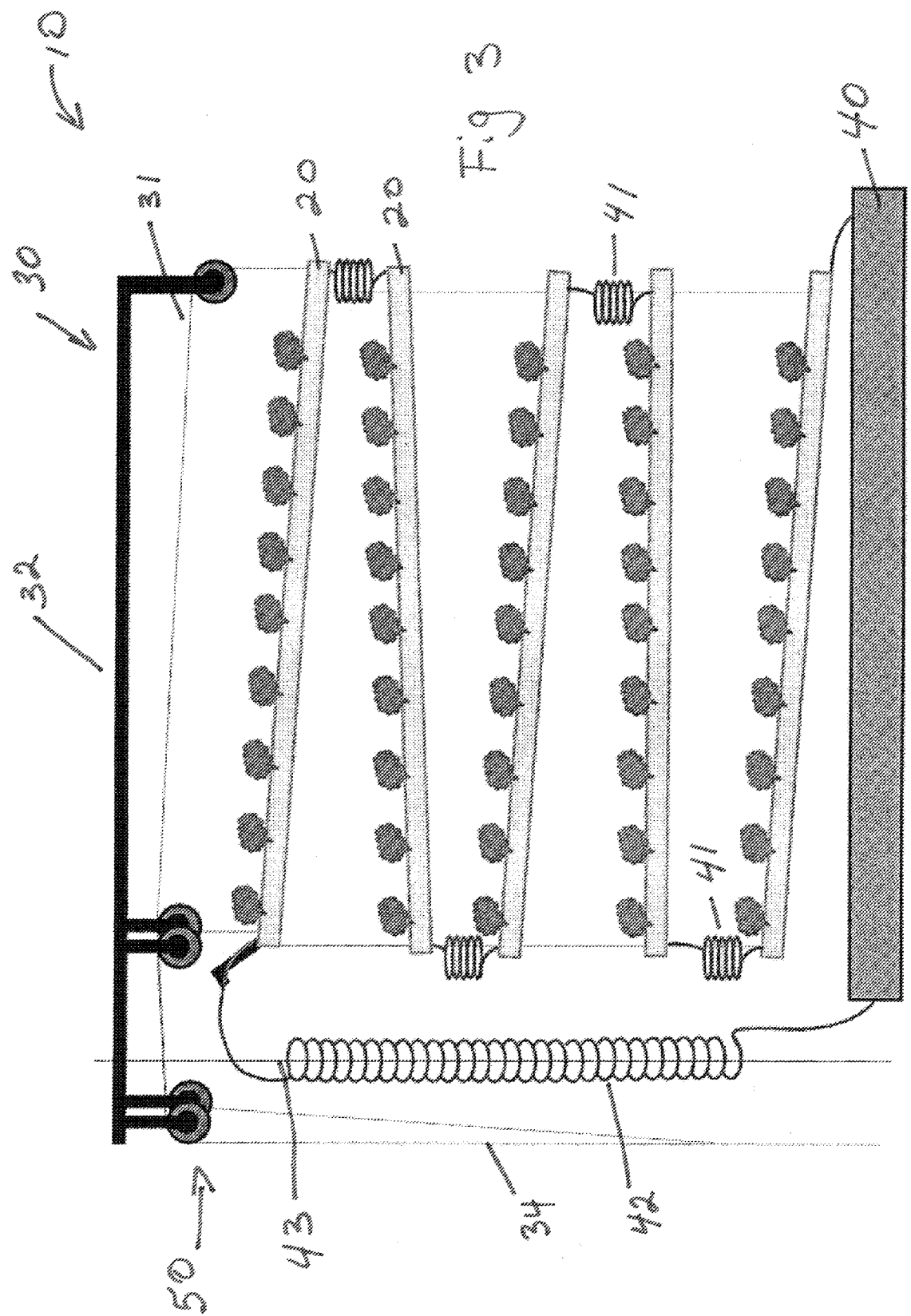

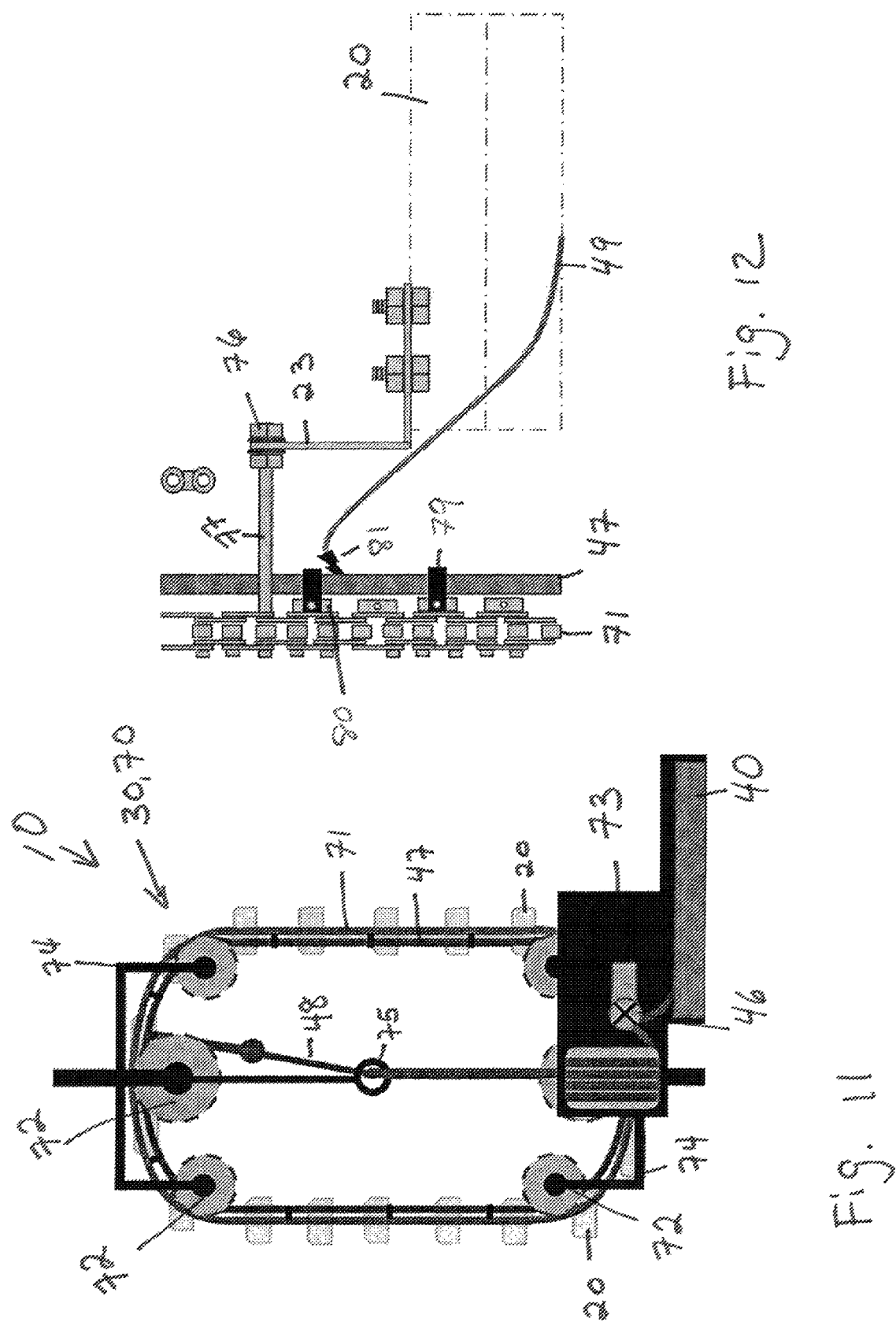

VERTICALLY INTEGRATED GREENHOUSE

CROSS REFERENCE TO RELATED APPLICATION

This application claims the priority benefit of U.S. provisional patent application Ser. No. 61/073,303, filed on Jun. 17, 2008, the contents of which are incorporated by reference herein in their entirety.

FIELD OF THE INVENTION

The present invention relates to structural systems for growing plants in urban settings. In particular, the invention is directed to a vertical greenhouse which is affixed to a façade of a multi-story urban building, or to the wall of a multi-story atrium or concourse.

BACKGROUND OF THE INVENTION

Increasing urban growth and global construction surges have underscored the importance of efficiency in the built environment. In the United States, buildings account for over a third of total energy use, two-thirds of electricity consumption, one-twelfth of the country's water consumption, and two-fifths of carbon dioxide emissions.

Agriculture has an equally significant impact on our world. Modern agriculture feeds billions of mouths every day, but is the world's largest consumer of land and water, the source of most water pollution, and the source of an estimated 15% of the world's greenhouse gas emissions. Three major trends will strain the global food system over the next half-century, and place significant additional pressure on the environment.

First, according to official UN estimates, global population is expected to exceed nine billion by 2050. Second, more than two-thirds of these people are expected to be urban dwellers. Urbanization requires that food, once grown and harvested, must travel hundreds or thousands of kilometers to reach consumers. Fresh produce travels an average of 2500 km to reach U.S. cities, adding to traffic congestion, air pollution, and carbon emissions. Third, global warming is predicted to lead to widespread shortages of food, water, and arable land by 2050 within a broad belt extending north and south of the equator and encompassing some of the world's most populous regions.

Growing food crops on or in buildings can help reduce our environmental footprint, cut transportation costs, enhance food security, save energy within the building envelope, and enrich the physical and psychological comfort of building occupants.

Hydroponics, the culture of plants in water, is a technically sophisticated commercial practice in most regions of the world. As publicly demonstrated by New York Sun Works at the Science Barge greenhouse in Manhattan, recirculating hydroponics can produce premium-quality vegetables and fruits using up to 20 times less space and 10 times less water than conventional agriculture, while eliminating chemical pesticides, fertilizer runoff, and carbon emissions from farm machinery and long distance transport.

BRIEF SUMMARY OF THE INVENTION

The present invention is a vertically-integrated greenhouse (VIG) which provides a novel system of food production in buildings. The present invention can be installed in a double-skin façade, building atrium, lobby, crystal palace, or winter garden, or other similar glass or open structure which provides sufficient natural lighting to illuminate the plant growing trays In addition to producing food, the invention is intended to reduce building maintenance costs by offering shade, air treatment, and evaporative cooling to building occupants, and enhancing the quality of the work environment of the building's occupants.

In addition, by adding commercial scale vegetable production, the present invention aims to strengthen the economic argument for the double skin façade, and thereby encourage widespread adoption of the double skin façade technology. Nevertheless, the invention is not limited to use in a double skin façade building, and can be installed in any location where there is sufficient light for growth of plants.

By meeting an ecologically significant share of the food demand of building occupants, the invention advances a more holistic set of expectations for the performance of green buildings, with the sphere of analysis enlarged to consider the resource consumption not only of the building itself, but also of the occupants.

The present invention may be referred to in this specification using such terms as a vertically integrated greenhouse, a VIG, a greenhouse, a vertical growing system, or a growing system. Each of these terms is to be considered as referring to the present invention.

The present invention is directed to a vertical growing system for cultivation of plants. The system comprises (a) a plurality of trays structurally configured for growing plants therein; (b) a tray suspension system to which the trays are adjustably affixed one above another; and (c) a water distribution system comprising a reservoir, a pump, and a water supply tube. The water distribution system provides a flow of irrigation water to the plants growing in the trays, and drainage of excess water from the trays.

The tray suspension system may comprise a drive train and means for adjustment of the vertical position of the trays to the drive system. The tray suspension system may also have a singular access point for user access and manipulation of the trays. That is, the greenhouse may have a single point to which a user can move the trays for planting, cultivation, harvesting, or other gardening tasks. The single point may be, for example, the harvesting floor of the greenhouse, the ground floor of the building, or the bottom floor of a growing module comprising the greenhouse. In one embodiment, the user can move all the trays sequentially through this singular access point by the drive train for ease of cultivation. In particular embodiments, the singular access point may be an area which is not the ground floor of the building. That is, the singular access point may be located on the second floor of the building and the gardener has access to all of the trays from this point.

The spacing between the trays in the suspension system is adjustable to optimize the amount of light passing through the greenhouse. That is, the tray suspension system may be configured to allow natural lighting to pass to the plants growing in the trays. The tray suspension system can also be modified to vary the amount of light passing through the greenhouse to surfaces behind the tray suspension system, such as interior office spaces. Such features permit the plants growing in the trays to receive an optimal amount of natural lighting, as well as allowing building staff to receive sunlight passing through the tray suspension system.

The trays in the vertical growing system may be structurally configured for growing plants using any convenient method. For example, the trays may be configured for growing plants hydroponically, such as via a nutrient film technique (NFT). Hydroponics involves growing plants using mineral nutrient solutions, without soil. Plants may be grown with their roots in the mineral nutrient solution only or in an inert medium, such as perlite, gravel, or mineral wool. The plants may also be grown in pots such as net pots which are placed in the trays. Such hydroponic techniques are known in the art.

Alternatively, the plants may be grown in a solid growing medium, such as soil, bark, loam, peat, sand, vermiculite, or other natural or synthetic growing medium. Combinations of natural and synthetic growing mediums are also encompassed within the scope of the present invention.

The trays may be spaced at any convenient vertical distance during a growing cycle. For example, the trays may be about 10-30 inches apart in the suspension system during a growing cycle. In other embodiments, the trays may be fastened to the tray suspension system at intervals which are outside of this range. For example, when the plants being grown in the trays are still seedlings, the trays may be spaced quite closely together, with a distance of 5 inches between the bottom of one tray and the top of the next lower tray. When the plants are maturing, the trays can be up to 30 inches or more apart to allow for unobstructed plant growth.

The term "tray" may include any kind of plant growing container, such as rectangular trays or gutters, circular or round pots, or containers having any other kind of dimension or shape. The trays may also be individual containers for growing one or more plants each. The trays can have any convenient dimensions, and be formed of any kind of material, such as plastic, metal, or a composite. Plastic trays are particularly convenient and lightweight. The trays can be purchased commercially from a vendor, or they may be prepared from commercially available components. The trays can also be open-ended gutters or closed square or rectangular tubes which are then sealed at their extreme ends to prevent water from exiting. In one embodiment, the trays are rectangular tubes formed from PVC-1 of dimensions 110 cm×55 cm×2.5 cm and are available from Gehr Plastics USA, Boothwyn, Pa. The rectangular tubes can be end-capped with a similar grade PVC sheeting which has been cut and shaped to suitable dimensions, and attached to the tubes using a food-safe silicone. In another embodiment, the trays are about 4-6 feet long. When the trays have closed tops, they will generally have plant penetration holes or openings for the plants. The size of the holes or openings is not critical, and neither is the distance between the openings. For example, the holes may be 1-4 inches in diameter and be 1-6 inches apart. Other diameters and distances are possible.

The trays in the vertical growing system can optionally be graded (have an angle of incline) to permit water to drain from the trays. For example, the trays may have a grade in the range of about 0.5-2 inches over 5 feet, or in the range of from $0.005°$ to $0.1°$. Alternatively, the trays may be level and ungraded. The trays may also contain internal baffles or other structures to adjust or maintain a particular water level height inside the trays.

The trays in the growing system may have respective inlets and outlets and may be interconnected by one or more water distribution tube(s) for providing water in series to the various trays. The water distribution system may be configured to provide water to an inlet of an upper tray. Water exiting this upper tray through an outlet may flow via gravity to an inlet of a lower tray. In this manner, excess water from an upper tray may exit the tray and flow down through a water distribution tube into a lower tray. When the trays are graded, water may flow from the side of the tray near the water inlet to the side of the tray near the water outlet. Therefore, there is sequential movement of water from upper trays to lower trays and eventually back to the water reservoir or drain.

In another embodiment of the invention, the trays may have respective inlets and outlets, and the water distribution system may provide water in parallel to each tray. In this embodiment, water enters through an inlet of a tray and excess water exits the tray through an outlet, flowing through a water distribution tube, or other means for conducting water from the tray, to the reservoir for recirculation, or to a drain for disposal. There may also be a plurality of water distribution systems in a given greenhouse, each water distribution system watering a different tray or sets of trays. For example, one kind of vegetable plant growing in a front set of trays may be watered using one water distribution system, and a different kind of vegetable plant growing in a rear set of trays may be watered using a different water distribution system. In this manner, different plants may receive optimal kinds of nutrient solutions.

The tray suspension system may optionally comprise means for tracking solar elevation for optimizing the amount of light provided to the trays. In this manner, the positions of the trays can be adjusted so as to maximize the amount of light the trays receive. The tray suspension system may comprise motorized means or manual means for adjusting the position of the trays. The means may also be computerized or automated to allow for automatic adjustment of the tray positions throughout the day.

The trays in the tray suspension system may be arranged in parallel vertical rows. For example, the trays may be arranged in a front row and a rear row. The front and rear rows of trays may be staggered and vertically adjustable relative to each other to optimize the amount of light passing to or through the trays. Alternatively, the trays may be aligned at the same height.

The tray suspension system may comprise any kind of means for raising and lowering individual trays or sets of trays. In one embodiment, the trays suspension system may comprise a drive train which is a plant cable lift system for adjustable vertical raising and lowering of the trays. The plant cable lift system may adjust the position of individual trays separately, or the lift system may adjust the position of sets of trays. For example, the cable lift system may independently and separately adjust the positions of front and rear sets of trays to optimize the amount of light passing through the trays.

The tray suspension system may alternatively comprise a drive train which is a conveyor system which vertically conveys each tray through the growing system while maintaining a substantially static spacing between trays. The conveyor system can thus move the trays in a circular loop through the greenhouse. Such an embodiment is useful for growing plants at different stages of maturity. For example, a worker may plant the trays over a period of weeks or months. As the plants in the trays mature, the worker may harvest plants from a particular tray, replant the tray, and then advance the conveyor system in a round-robin fashion so as to obtain access to the next tray containing harvestable plants. In such a manner, the user can be successively planting, growing, and harvesting as the trays travel though the conveyor system.

The suspension system may comprise any kind of means which move the trays vertically through space. In one embodiment of the invention, the suspension system may comprise a pulley assembly, a set of suspension wires for spatial alignment of the trays, and a set of lifting wires for vertical positioning of the trays.

The manner in which the trays are affixed to the suspension system is not critical. The trays may be releasably affixed to the suspension system to permit removal of individual trays from the greenhouse in case a tray becomes damaged or worn, or for replacement of seedling trays with large plant trays. Alternatively, the trays may be permanently mounted to the suspension system.

In one embodiment, the trays are affixed to the suspension system via brackets, such as via releasable L-shaped brackets. The brackets may be located on opposite sides of the trays to provide secure retention of the trays in the vertical suspension system, or they may be located on a single side of the tray. There may be a single point of attachment of a bracket to the suspension system, or there may be two or more points of attachment.

In an embodiment of the invention, the water distribution system is mechanically independent of the conveyor system or the tray suspension system. That is, the water distribution system will be structurally separated from the tray suspension system. In certain embodiments, components of the water distribution system can be supported by the tray suspension system. For example, water hoses may be mounted to or looped over parts of the tray suspension system. Nevertheless, in such embodiments, the water distribution system and the tray suspension system are still structurally separated.

The water distribution system may be configured to provide plant nutrients to the trays, for example, in the form of a fertilizer, minerals, or other substances dissolved in the water. When desired, a bactericide, fungicide, or other additive may be added to the water distribution system to kill bacteria or fungi.

The water distribution system can be configured to irrigate the trays in any convenient manner. For example, the water distribution system may irrigate the trays simultaneously (in parallel, e.g., all trays being watered all at once), sequentially (in series, e.g., water is delivered to a top tray, and excess water flows down through successive trays, or trays are watered successively), or a combination of both (water may be provided to simultaneously to two or more upper trays, and excess water flows down through successive trays to provide water). In one embodiment, the water distribution system may be configured to irrigate particular subsets of trays, such as front trays and rear trays separately. Other combinations of watering methods are possible and within the scope of the present invention.

In particular embodiments, where there is a plurality of water distribution systems, these systems may nevertheless have shared components, such as shared water reservoirs. In other embodiments, the water distribution systems may be entirely separate, such as in the case when there are multiple kinds of plants being grown and each kind of plant has its own particular or specialized nutrient needs.

To minimize water waste, the water distribution system may be configured for recirculation of the irrigation water within the growing system. In this embodiment, excess water drains to the reservoir and is then recirculated and pumped to the various trays. Alternatively, the water distribution system may be configured to dispose of water exiting the plant trays. In such embodiments, the reservoir may be a specific container for storage of water, or it may be a building water supply.

The growing system may be structurally configured for assembly in any kind of building or to any portion of a building which provides sufficient lighting. In one embodiment, the present invention may be configured for installation to a building façade, such as a glazed curtain wall (a "double skin"). The building façade can face any direction, although southern exposures provide the greatest amount of natural sunlight. The VIG may be installed or mounted to the outside of an existing building façade, as a retrofit building project. The void space behind the curtain wall is the greenhouse containing stacked rows of crops.

The VIG may alternatively be installed inside an existing building. For example, the greenhouse may be installed in a building atrium, lobby, crystal palace, or winter garden, or other similar glass or open structure which provides sufficient natural lighting to illuminate the plant growing trays. Although the present invention is termed a "greenhouse", it does not need to be installed in a conventional glass-covered greenhouse building, and can be erected in any location which receives sun. The greenhouse can also be installed in an outside location to demonstrate vertical farming.

The trays are arranged in a tray suspension system which comprises a drive train which positions the trays in a desired arrangement. In one embodiment, the tray suspension system comprises a drive train which is a plant cable lift (PCL) system wherein the trays can be raised and lowered. The trays can be moved in sets or individually within the greenhouse. In another embodiment, the trays suspension system comprises a drive train which is a conveyer assembly in which the tray spacing is static but the entire assembly can rotate.

The inventive design creates a plant propagation and cultivation system that can be accessed and maintained from a singular access point, such as at ground level, while allowing for expanded vertical growing and therefore using currently underutilized space and sunlight. By utilizing vertical height, the greenhouse is able to grow plants in a location which otherwise might be vacant.

The VIG may have any length, width, or height. The dimensions of the greenhouse can be close to those of the tray suspension system. In one embodiment, the vertical greenhouse may have a width in the range of 1-2 meters, such as 1.5 m.

The VIG may be conveniently structured as modules, and any number of modules can be installed in a building. For example, one module can consist of a plurality of trays fastened in a single tray suspension system and an associated water distribution system. The modules can be installed in any convenient fashion, such as side by side along the façade of a building.

In one embodiment, the greenhouse modules are up to 40 m high, that is, up to about 10 floors high. In this embodiment, shallow trays of plants, 2.0 m long, can be suspended in a tray suspension system at one or both ends of the trays. A computer activated motor can control the positioning of the trays.

In one embodiment, the invention incorporates a well-established hydroponic method called nutrient film technique (NFT). A thin film of water flows along the bottom of each tray, delivering nutrients to the roots of leafy plants before exiting the tray. The water level in the NFT trays is typically ¼-½ inch. The solution is typically recovered at the farming level for reuse. Transpiration is limited to 10% of the flow rate by design.

In one embodiment, seeds are germinated in flat trays on the bottom level, and planted into the bottom tray. In a conveyor embodiment of the invention, the trays rise up the front of the facade, pass over the top of the tray suspension system and return down the back, returning to the bottom for harvest. The duration of the trip would depend on the kind of plants being grown. Fast-growing plants harvested in an immature stage (such as baby lettuce) may be harvestable after a few weeks, whereas slow-growing plants will take several weeks or months. The particular direction of travel or location of trays is not critical to the successful practice of the invention.

In embodiments of the invention where the trays are arranged in multiple parallel vertical rows, the tray suspension system may be designed with the capability to dynamically track solar elevation both diurnally and seasonally in order to optimize the balance between light capture, shading, and occupant view. Manual adjustment of the tray positions is also possible, via a hand crank or other means.

Vertical spacing between trays on the cable can also be varied. Rows can be more tightly spaced in winter, when the sun is lower, resulting in steady yields year-round. In winter, when the greenhouse is installed in a double glazed façade, the vertically integrated greenhouse is an effective solar capture device, warming and insulating the glazed facade of the building. On winter nights, exhaust air from the building can be ducted to the greenhouse to maintain plant temperatures.

In summer, the VIG shades the interior of the building, and reduces solar heat gain by absorbing energy as latent heat, through transpiration. The VIG helps to mitigate the urban heat island effect like a green roof, but over a much larger area.

BRIEF DESCRIPTION OF THE DRAWINGS

FIG. 1 illustrates embodiments of a multi-floor tray vertically integrated greenhouse according to the present invention in which the trays are arranged in parallel vertical rows; and workers are viewing the plants from the cultivating floor of the greenhouse;

FIG. 2 illustrates maximization of solar lighting of the trays through optimization of solar angle by variable registration of columns of trays, and via "Venetian blind" adjustment of the plant growing trays;

FIG. 3 illustrates a schematic view of an embodiment of the invention in which the tray suspension system is in the form of a plant cable lift system, and the trays are in alternating downward sloping angles; and a water distribution system provides water from a reservoir to an upper tray and the water flows down by gravity through successive trays to return to the reservoir for recycling;

FIG. 11 illustrates a schematic view of a second embodiment of the invention, wherein the tray suspension system is in the form of a conveyor system which vertically conveys each tray in a circular path through the growing system;

FIG. 12 illustrates a side view of the conveyor system of FIG. 11 and shows the attachment of a tray and water inlet line to the drive chain;

DETAILED DESCRIPTION OF THE INVENTION

Figure 5:
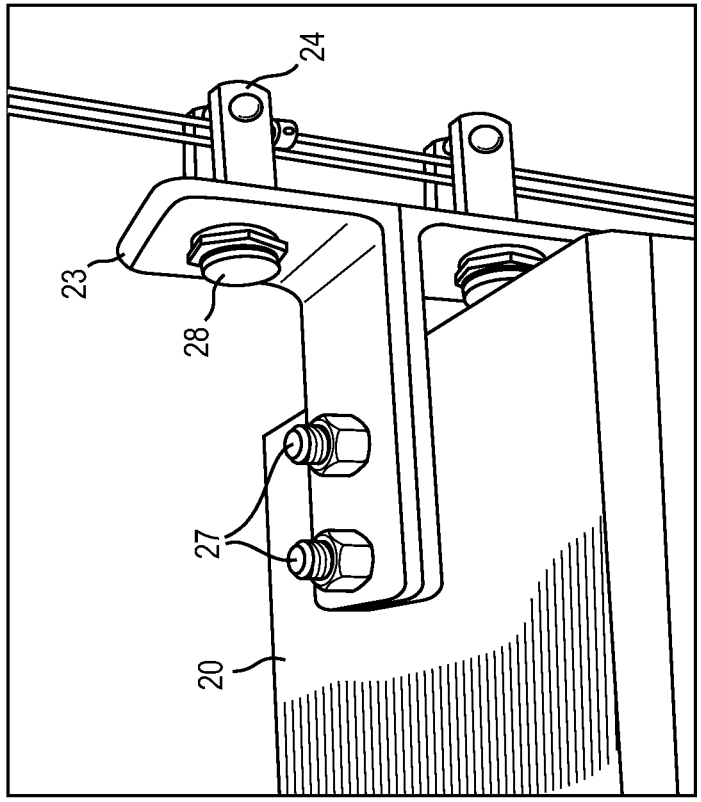
FIG. 5 illustrates a top view of the tray and fastener shown in FIG. 4.

The inventive VIG system consists of vertically interconnected trays that hold plants seeded in media and/or net pots, cups, etc. and in doing so conveys nutrient enriched water to the plant root area. These horizontal trays can be interconnected through plumbing, structural support, or both. In one embodiment, the trays are convex or formed in a shape which channels water flow evenly to plants and is capped on both ends to prevent spillage. The water conveying tubing can be attached to the down slope side of the gutter either through a bulkhead in the tray bottom or a through-wall fitting in the end cap.

In a first embodiment of the VIG-system (FIGS. 3-10, discussed below), termed the "collapsible" or "shade system" embodiment, plant cable lift systems are used to raise and lower trays. In such an embodiment, the trays are fastened to drive train guide wires by way of fasteners. To mount the trays to the drive train, L-shaped brackets may be attached to the top of the tray at both ends, and these brackets may have clevis ends bolted into them. The clevis ends can be opened with a latch and the trays removed from the guide wires. The wires may have set screw collars placed at measured distances that hold up the trays. The screw collars have a larger outside diameter than the inside diameter of the clevis openings to ensure the trays do not slip down the wires. The specific kind of fastener is not critical, and the use of other kinds of fasteners to secure the trays to the tray suspension system is within the scope of the present invention.

In this embodiment of the invention, there are two sets of suspension guide wires in the system, one wire of each set at opposite ends of each tray. One set of wires is taut and serves as the actual guide wires that keep the trays in line. The other set of wires, to which the collars are fastened, are termed lifting wires. The wires are fed through pulley blocks (or comparable device(s)) to facilitate raising and lowering of the trays. The trays can either be spaced apart at particular desired heights, or collapsed on top of one another. A motor and winch can be used to raise or lower the lifting wires.

In this embodiment, water travels sequentially from tray to tray via gravity flow. The water enters the topmost tray, and excess water is channeled into tubing at the down slope side of the tray and travels to the next lowest tray. The water flows from tray to tray until the lowest tray drains into a reservoir where there is a pump that returns the water to the top.

In a second embodiment of the invention (FIGS. 11-16), termed the "conveyer" embodiment, a hollow pin chain drive serves to circulate the trays through the greenhouse. In this embodiment, L-shaped gutter brackets have a pin bolted through them. The pin is attached through a hollow pin chain link on the chain which drives the system. The link and pin assembly has springs to maintain tension so that the trays can be removed but will not slip out of the chain drive. The trays can be removed by unbolting the hanging pin at either the chain or gutter bracket points.

The chain drive is mounted on cogs which are attached to arms (or cog hangers) that hold up the entire system. The chain drive can be embedded in a baffled vertical gutter on the drain or down slope side. Baffling in the return gutter can be used for water containment and channeling to avoid exposing the chain to water flows. The hanging pin is shaped so as to permit the trays to maneuver as they travel in the conveyor system. The hanging pin can also be fixed in position at the chain but not at the tray bracket point in order to allow for pivoting of the tray. This arrangement allows the tray to stay in the correct upwards orientation while the entire assembly rotates. Other kinds of fasteners can be used to secure the trays to the conveyor system and such use is within the scope of the present invention.

In this embodiment, water can be supplied to all trays simultaneously through a pressurized water supply tube with emitters. This supply tube has a swivel fitting to allow the supply hose to remain static and unkinked while the feed hose rotates with the chain drive. Water flows through the tray and then spills into an oval shaped continuous vertical gutter that captures water flow and channels it back to the reservoir, where the supply pump is located.

Although the inventive greenhouse has been described as utilizing natural lighting and being assembled in locations where there is sufficient natural lighting for growing plants, the invention is not limited to being illuminated solely by sunlight. In alternative embodiments of the invention, the greenhouse and plants therein are illuminated by a combination of sunlight and artificial illumination. For example, during cloudy days or for supplemental illumination, the trays may be illuminated with suitable incandescent, fluorescent, or other kinds of lighting, such as cool white (CW), Gro-Lux (GL), wide spectrum (WS), and Verilux Tru-Bloom (VX) lamps. Such lamps may be mounted to the tray suspension system or any suitable part(s) of the greenhouse structure. Particular gardeners may wish to minimize the use of artificial lighting as it can increases costs as well as the carbon footprint of the invention.

The inventive greenhouse can be installed in a frame, cage, or similar support structure to provide strength. For example, a frame can be built of aluminum, stainless steel, wood, fiberglass, plastics, or other materials, and the tray suspension system can be mounted to the sides, top, and/or bottom of the frame. The use of a frame allows the gardener to install the greenhouse as a free-standing structure inside an existing building without having to couple, moor, or otherwise attach any greenhouse components to the building. The frame can be the same height as the tray suspension system, or it can be taller or shorter than the tray suspension system. The frames can also be coupled or joined together to form a larger structure for supporting a plurality of greenhouses. The greenhouse or frames may also be fastened to the building or its wall(s) for structural support.

The invention can be installed in the form of independent blocks or modules. Each block may have its own tray suspension system and water supply system. Individual growing blocks can be modular and independent of each other, and a plurality of growing blocks can be installed side by side.

There is no limitation on the height of the individual blocks or the width of the tray suspension system in a particular block, and different blocks or greenhouses in the same building may have the same or different heights or widths. Although there is no limitation on the height of the greenhouse blocks, certain embodiments may be conveniently installed in blocks which are shorter than a building height, such as in 5-floor blocks or 10-floor blocks. Such embodiments can be installed in a double skin façade or in a building lobby, atrium, or other sunlit structure.

When multi-floor embodiments of the invention are installed in a building, one or more particular floors may be designated as harvesting floors, allowing workers to grow or harvest plants from those floors. The remaining area of the harvesting floor(s) may be used for various purposes, as offices, manufacturing, storage, or other uses.

When multiple greenhouses are installed in a building, certain floors of a building may not have a growing block, thereby permitting occupants of that floor to have an unobstructed view of the outside. For example, in a 44 story building, greenhouse blocks may be installed on floors 1-10, 12-21, 23-32, and 34-43, leaving floors 11, 22, 33, and 44 without greenhouse blocks. Alternatively, certain sides of a building may contain a greenhouse, such as the south-facing façade, and other portions of the façade may not have a greenhouse, such as the north-, west-, and east-facing façades. All such embodiments and combinations are within the scope of the present invention.

When the vertically integrated greenhouse is installed in a double-skinned portion of the façade, the greenhouse can be physically separated from building occupants by a glass wall. The occupants would be able to see the plant trays move up or down in the double-skinned façade. The wall may be installed with windows which occupants can open for additional ventilation.

The plants grown in the trays may be any combination of vegetable, herb, fruit, or flowering plants. For increased employee motivation, trays which are viewable in certain portions of the building, such as executive offices or dining facilities may contain flowing plants, while trays suspended in other portions of the building, such as office, manufacturing, or warehouse space, may contain vegetable or herbs. Such embodiments are primarily aesthetic and do not affect the structure of the vertically integrated greenhouse.

The present invention will now be described with reference to the Figures, wherein like numerals refer to like elements.

FIG. 1 illustrates an embodiment of a multi-floor tray vertically integrated greenhouse (10) according to the present invention in which the trays (collectively (20)) are arranged in parallel rows. FIG. 1A illustrates the greenhouse (10) in an expanded state, and FIG. 1B illustrates the greenhouse (10) in a collapsed state. FIG. 1C illustrates a right-side view of the greenhouse (10) shown in the embodiment of FIG. 1A. In the expanded state, plants have space to grow, and in the collapsed state, the trays are close together and suitable for storage or for growing small plants or starting seedlings.

For ease of illustration, the trays (20) in FIGS. 1A and 1B are shown arranged in a single parallel vertical row, although in other embodiments, the trays may be arranged in two parallel vertical rows, such as shown in FIG. 1C. Alternatively, the trays may be arranged in three or more parallel rows, and the particular arrangement will depend upon the structure of the tray suspension system and the amount of space allotted to the greenhouse.

FIGS. 1A-1C show workers located on a harvesting floor (11) of the greenhouse. The harvesting floor may have space for storage of harvesting bins, germination trays, or other components of the greenhouse (not illustrated). Although the harvesting floor is illustrated as being on the lowest level of the greenhouse module, the harvesting floor can be any other floor where workers can manipulate and cultivate the trays. In certain embodiments, there may be more than one harvesting floor per greenhouse. Planting and harvesting will generally occur on the harvesting floor. The openness of the greenhouse allows natural sunlight to pass through the tray suspension system to the plants growing in the trays, and also through to the interior of the building for natural illumination.

The greenhouse has a tray suspension system (30), which is a plant cable lift system in this embodiment. The plant cable lift system comprises guide wires (31), a pulley system (50) and a motor (60) for adjusting the position of the guide wires or trays.

In the illustrated embodiment, the greenhouse is 40 meters in height and the lowest tray is approximately 1 meter from the bottom of the greenhouse. In other embodiments, the greenhouse will have other heights, for example, several meters or tens of meters, and the positioning of the trays within the tray suspension system may be different. The specific height of the greenhouse in the building will depend upon the amount of space to be allocated to the greenhouse and individual choice. The greenhouse has a water circulation reservoir (40) located on the harvesting floor to collect and recirculate nutrient water.

The greenhouse may also have a service system (not illustrated) for repair of the suspension system, water distribution system, or other elements of the greenhouse. The service system can comprise a device which allows a servicer to reach upper portions of the greenhouse which are not otherwise readily accessible from the ground or harvesting floor. In one embodiment, the service system is a winch from which the servicer can be suspended for repair. The winch may be mounted to an upper portion of the greenhouse, a support frame, or any other components, and may include a platform, harness, or other structure for supporting a servicer during repair. The service system may be conveniently stored at the top of the greenhouse when not in use. In case of need, the servicer can cause the service system to descent for entry, enter the platform or other structure, and proceed to adjust its height as necessary so as to allow convenient repair or servicing of the components of the greenhouse.

When the inventive greenhouse is installed in a double-skin façade, the façade can be provided with windows or ventilation ducts to allow building air or outside air to enter or exit through the greenhouse.

FIG. 2 illustrates maximization of solar lighting of the trays through adjustment of the tray positions. As shown in the figure, the solar angle can be adjusted to account for factors such as the time of day, time of year, and height of the plants growing in the trays. Such adjustments allow optimization of the amount of sunlight which reaches the plants, taking into account shading of forward trays (21) (trays which are adjacent to building façade and are in direct sunlight) by rear or back trays (22) (trays which not adjacent to the building façade and may not receive full sunlight). This adjustment of position can occur manually or by computer control. When the adjustment is by computer control, the computer can be programmed to optimize light to the trays throughout the day with minimum human intervention.

FIGS. 2A and 2B illustrate real-time optimization of solar angle by "Venetian blind" adjustment of the plant growing trays. The figures show that variable registration of vertical columns of trays can track the sun diurnally. As shown in the figure, the relative positions of the trays can be adjusted to allow for changes in solar angle during the course of a single day. FIG. 2A depicts the solar angle in the middle of the day for sets of front trays (21) and rear trays (22). The solar angle is at 45°. FIG. 2B shows that earlier and later in the day, the solar angle will be 25°.

To optimize the amount of light transmitted to the rear trays, the positions of the trays can be adjusted while maintaining a constant distance between front and rear trays. In the figures, the rear row of trays (22) is raised slightly. Alternatively, depending upon the time of day and time of year, the rear row of trays could be slightly lowered, or the front row of trays (21) could be raised or lowered, so as to ensure that the trays obtain an optimal amount of sunlight.

The amount of light received by the rear trays and transmitted through the greenhouse to the building interior is thereby optimized. In this manner, the building occupants also obtain a maximal amount of sunlight.

FIGS. 2C and 2D illustrate seasonal adjustment of vertical plant spacing. FIG. 2C depicts a winter solar angle of 20°, and the position of the trays is adjusted to capture an optimal amount of light under these conditions. FIG. 2D depicts a summer solar angle of 65° for the same trays. As seen in these figures, adjustment of the vertical spacing of the trays in relation to the solar angle permits plants growing in both trays to receive a maximal amount of light. That is, the trays can be moved further apart in summer to account for the steeper solar angle, and they may be moved closer together in winter to capture sunlight entering the greenhouse at a shallower solar angle.

The plants growing in the front trays (21) do not obscure sunlight from reaching plants growing in rear trays (22). As shown, the distance between trays can be adjusted to account for the steeper solar angle in the summer as compared to winter. Accordingly, the invention permits adjustment of tray position for optimization of the amount of light received by the trays.

It should be noted that optimization of sunlight received by a tray does not necessarily mean a maximization of sunlight received by the tray. In certain embodiments, such as for plants requiring full sun, a gardener may wish to adjust the tray positions so that the plants growing in rear trays do obtain a maximal amount of sunlight. In other embodiments, such as for plants requiring partial shade, the gardener may wish to move the front trays so that they partially screen the rear trays to reduce the amount of sun transmitted to the rear trays, for example, to prevent plants from burning due to excess sun. In such embodiments, an optimal amount of sunlight would comprise a partly shaded condition, or full sunlight for less than an entire day.

In embodiments of the greenhouse containing three or more vertical rows of trays, various combinations of full-sun and partial-sun tray positions are possible using the seasonal adjustment of vertical plant spacing and Venetian blind techniques discussed above. In any of these embodiments, the gardener would adjust the positions of the tray so that the plants growing therein receive an optimal amount of sun for each kind of plant.

FIG. 3 illustrates a schematic view of a first embodiment of the inventive greenhouse (10) in which the tray suspension system (30) is in the form of a plant cable lift (PCL) system (32). The plant cable lift system comprises a pulley assembly (50) which is located at the top of the figure. The plant cable lift system also comprises guide wires (31), consisting of a set of suspension wires for spatial alignment of the trays, and a set of lifting wires for vertical positioning of the trays (discussed below). The PCL system allows for movement of the trays (20) individually or in sets. In the illustrated embodiment, the suspension wire (34) is forked and the double-pulley arrangement of the pulley system (50) allows for single user operation.

In the illustrated embodiment, the trays are arranged in downward sloping angles for efficient distribution of water. The lower end of each tray (20) is connected by a self-retracting drainage hose (41) to the upper end of the tray below. A water distribution system pumps water via a pump (not illustrated) from a reservoir (40) at the bottom of the figure up to the highest tray via a water supply tube (42). The water supply tube will generally be supported at one or more locations and held in place via a wire, clamp, or other kind of fastener. In this embodiment, the water supply tube is fastened to a vertical wire (43) which extends the length of the greenhouse. The vertical wire provides support and stability to the water supply tube.

Water flows by gravity from the highest or uppermost tray, and is channeled into the drainage hose at the down slope side of the tray and travels to the next highest tray. The water flows down from tray to tray until the lowest tray drains into the reservoir, from which the pump returns the water to the uppermost tray. The gardener may optionally install one or more filters in the water distribution system to prevent plant roots, growing medium, or other elements or debris from clogging any of the parts of the water distribution system. The water distribution system may further comprise flow meters, clamps, valves, taps, or other plumbing fixtures to monitor or adjust the flow of water within the greenhouse.

In alternative embodiments of the invention, the reservoir (40) may be located at the top of the greenhouse (10) instead of at the bottom. Water is allowed to flow out of the reservoir into the uppermost tray via a gravity feed. Excess water from the topmost tray flows via the gravity feed to successively lower trays. After the water exits the lowest tray, the pump pumps the excess water up through a water supply tube back to the reservoir. In this embodiment, water successively flows out of a water outlet of one tray and into the water inlet of the next highest tray.

In these embodiments of the invention, water is recirculated in the system. In this manner, recycling excess water reduces water draw from the building water supply, and also reduces the amount of water entering the sewer system. In other embodiments, the water distribution system can dispose of excess water into a drain. Water may also be periodically drained from the system after it has been recirculated a number of times. For example, the water distribution system can be configured to change the water weekly, twice a week, three times a week, once a month, twice a month, or any other particular interval. In such embodiments, the lowest drainage hose can be detached from the reservoir and the water allowed to run into a drain or sewer. The water distribution system may also have automatic feeders to ensure that the water levels in the reservoir or in the system are at minimum or optimum levels.

Figure 4:
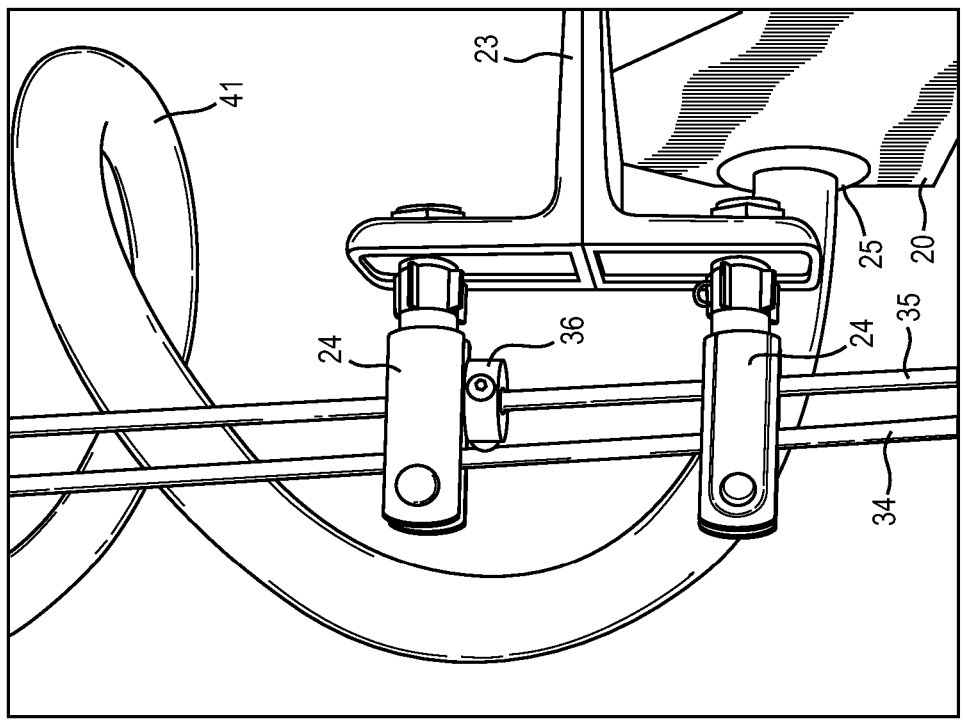
FIG. 4 illustrates a left-side portion of a tray fastened to a plant cable lift tray suspension system, in which the tray has been mounted to a lift cable via a lifting collar and an attachment bracket with a clevis fitting, and guide cables are used to maintain the position of the tray in the suspension system; and the tray is connected to a water-inlet tube.

FIG. 4 illustrates a left-side portion of an embodiment of a tray (20) which has been fastened to a plant cable lift tray suspension system. The tray has been fitted to a pair of L-shaped attachment brackets (23) which are provided with clevis fittings (24), and the tray has been mounted to a lift cable (35) via a lifting collar (36). In the illustrated embodiment, the L-shaped brackets have been fastened to the tray top at both ends, although in other embodiments the fasteners may be attached to the bottom or sides of the trays. Attaching the fasteners to the tops of the trays has the advantage of reducing chances for leakage, as compared to attaching the fasteners to the bottoms of the trays. The L-shaped brackets have clevis ends bolted into them. These clevis ends can open with a latch to allow the trays to be readily removed from or fastened to the guide wires.

Suspension wires (34) are used to maintain the spatial position of the tray in the tray suspension system. That is, the suspension wires are used to maintain the trays (20) so they are substantially in a single column, one tray vertically over another. The lifting wires (35) are used to adjust the vertical positioning of the tray, and by raising and lowering the lifting wires, the trays are caused to move up and down within the tray suspension system. The suspension wires and lifting wires may collectively be termed "guide wires" for ease of discussion.

In the illustrated embodiment, screw collars or lifting collars (36) are fastened to the listing wires at measured intervals to maintain the trays in a particularly desired position. The outside diameter of the screw collars (36) is larger than the diameter of the openings of the clevis fittings (24) in order to maintain the trays in position and prevent the trays from slipping. The guide wires may be fed through pulley blocks or comparable structures to facilitate the raising and lowering of the trays. In other embodiments, other kinds of fasteners can be used to mount the trays to the tray suspension system.

The term "wire" or "guide wire" is to be interpreted as encompassing any kind of cable, rope, wire, chain, or other strand used for structural support. The wire can be formed of metal, plastic, composite, or other any other material or combination of materials. The wire can also be coated with another substance for improved properties, such as plastic for water resistance, or be galvanized for protection against rust. The wire can be single-stranded, or formed of multiple strands which have been twisted, braided, woven, or otherwise combined together. The wire may also be plurality of wires located at various locations of a tray. For example, there may be a total of four suspension wires, each of which located at opposite corners of a rectangular tray. The guide wires are all taut and maintain the trays in position.

Depending on their position, the trays may be "collapsed" on top of one another, or they may be spaced apart at various distances. The trays may be "collapsed", that is, very close together, when they contain very small plants or seedlings which require minimum growing space in their current stage of development. The trays may also be collapsed when the greenhouse is not being actively used. When the plants start to become larger, the trays can be moved apart to give the plants a suitable amount of growing space. The tray suspension system can comprise a motor and winch (FIG. 1, element (60)) to raise or lower the lifting wires and thereby raise and lower the trays. The trays can also be moved by hand by adjusting the positions of the screw collars (or other fasteners). The motor can optionally be foot operated to permit gardeners to keep their harvesting hands free.

The tray has an inlet (25) which is located on the left side of the tray. A coiled water drainage tube (41) from an upper tray is connected to the illustrated inlet. Excess water flows out of the upper tray, passes through the water drainage tube, and enter the illustrated tray via the water inlet. In alternative embodiments, the inlet may be located on the top of the tray, and water would enter the tray through that inlet and subsequently flow down into the tray.

FIG. 5 illustrates a top view of the tray and fastener shown in FIG. 4. The figure shows that the L-shaped brackets (the tray mounting brackets) (23) are fastened to the top of the tray by two screws and acorn hexagonal nuts (together, (27)). The bracket mounting screw bolts come up through the tray (20) to meet the nuts on top. The clevis (24) is affixed to the tray mounting bracket using screws and bolts (28), and the bolts are perpendicular to the bracket through drilled holes.

The materials of construction of the brackets and fasteners are not critical, although they must be sufficiently strong so as to securely support the weight of the tray and plants in the tray suspension system. In one embodiment, the brackets and fasteners are manufactured from a non-rusting material, such as brass, zinc, or stainless steel. These components, or any of the components of the greenhouse, may also be galvanized, plated with a non-rusting material, or coated with a substance to prevent rusting, oxidation, or general deterioration.

Figure 6:
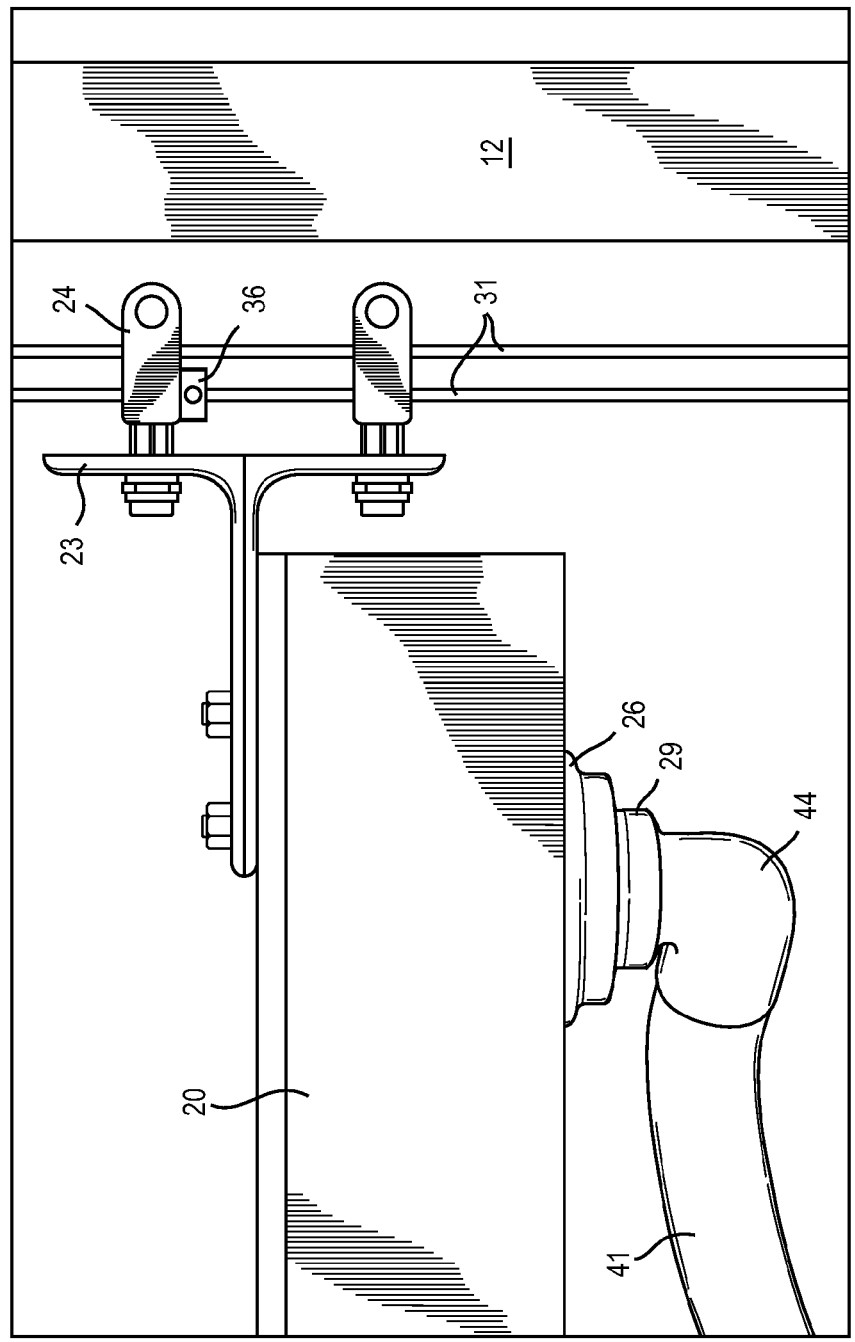
FIG. 6 illustrates a right-side portion of the tray shown in FIG. 4, in which a water outlet tube has been attached to allow for drainage of water from the tray.

FIG. 6 illustrates a right-side portion of the tray (20) shown in FIG. 4, in which a water drainage tube (41) has been attached to allow for drainage of water from the tray. The tray has been fastened to the tray suspension system using L-shaped brackets (23) and clevis attachments (24). In this embodiment, the left side (FIG. 4) and right side (FIGS. 5 and 6) of the trays (20) are identical and utilize the same bracket and clevis attachment fasteners. In other embodiments, the trays may have different kinds of fasteners on opposite ends of the trays. A portion of a greenhouse support frame (12) is visible behind the clevis and guide wires (31).

In one embodiment, the ends of the tray or the fasteners may be encased with a baffle, sleeve, or other structure to prevent water from dripping onto the fasteners and causing rusting or deterioration.

The illustrated right side of the tray has a slight downward angle to provide a grade. This grade permits water to travel from an inlet (FIG. 4, element (25)) down along the length of the tray (20) without substantial pooling. Excess water flows out of the outlet (26) located at the bottom of the tray (FIG. 6). In the illustrated embodiment, the tray has a grade of about 1 inch over 5 feet. That is, the lifting collar (36) located on the right side of the tray is one inch lower as compared to the lifting collar (36) located on the left side of the tray. In other embodiments, the grade can be greater or less than 1 inch over 5 feet. Generally, the higher the grade, the more quickly water will flow through the tray. The tray may also include interior baffles to provide for a particular water level height inside the trays.

Excess water from the trays drains into an outlet (26) formed by a commercially available bulkhead fitting (29) into which an elbow (44) has been threaded. The bulkhead has an FNPT (female) threading and the elbow has the equivalent MNPT (male) threading. The fittings and elbows are sealed with silicone to prevent leaks. In the illustrated embodiment, an outlet hole has been manually drilled into the tray, and the bulkhead inserted in the outlet hole. The water drainage tube (41) can be attached via a barbed friction fit to the elbow, clamped with a locknut, or attached using any other suitable means. These components are commercially available from vendors such as McMaster-Carr, Elmhurst, Ill. and Aquatic Eco-Systems, Inc., Apopka, Fla.

The water drainage tube (41) connected to the outlet (26) may be formed from plastic, metal, a composite, or another substance or combination of substances. The diameter of the outlet or drainage tube is not critical. In hydroponic embodiments of the invention, the water level in the tray will generally be maintained at about ¼-½ inch. To avoid slow drainage of the tray and concomitant pooling of water near the outlet, a convenient diameter for the water outlet can be about 1¾-2 inches in diameter.

Similarly, the diameter of the water inlet (FIG. 4, element (25)) is not critical. In one embodiment, the diameters of the water inlets and outlets, and the bulkhead and elbow fittings used for the inlet and outlets, will be identical. In such embodiments, the number of separate parts required for the invention is decreased as the same parts can be used for the inlet (25) and outlet (26).

In the illustrated embodiment, the trays are watered in series, as water flows from the topmost tray down through successive trays until it flows through the lowest tray. In alternative embodiments, the trays may be watered in parallel, that is, all the trays being watered at the same time. In such embodiments, the pump may pump water to each tray at the same time via separate water distribution tubes. Each tray may have a separate water inlet, and each tray may be watered at substantially the same time. Excess water from the trays drains to a common reservoir for recirculation, or to a drain for disposal.

Figure 8:
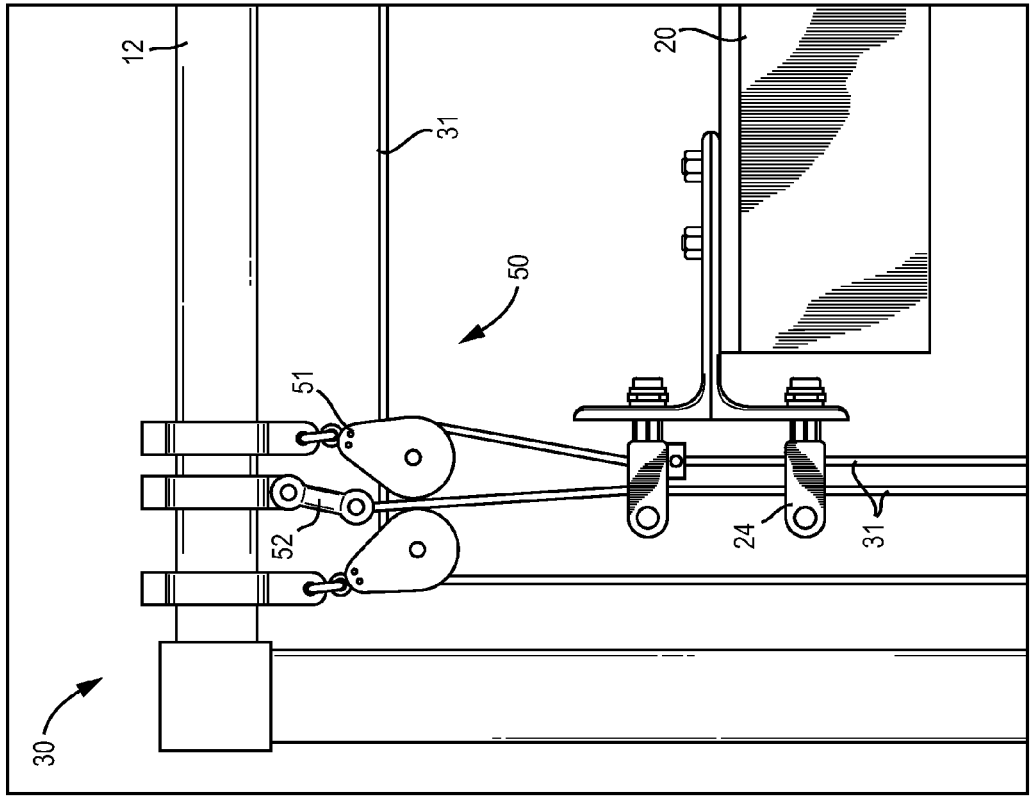
FIGS. 7 and 8 illustrate a drive train in the form of a pulley system for use in raising and lowering trays in an embodiment of a tray suspension system forming part of the present invention.
Figure 7:
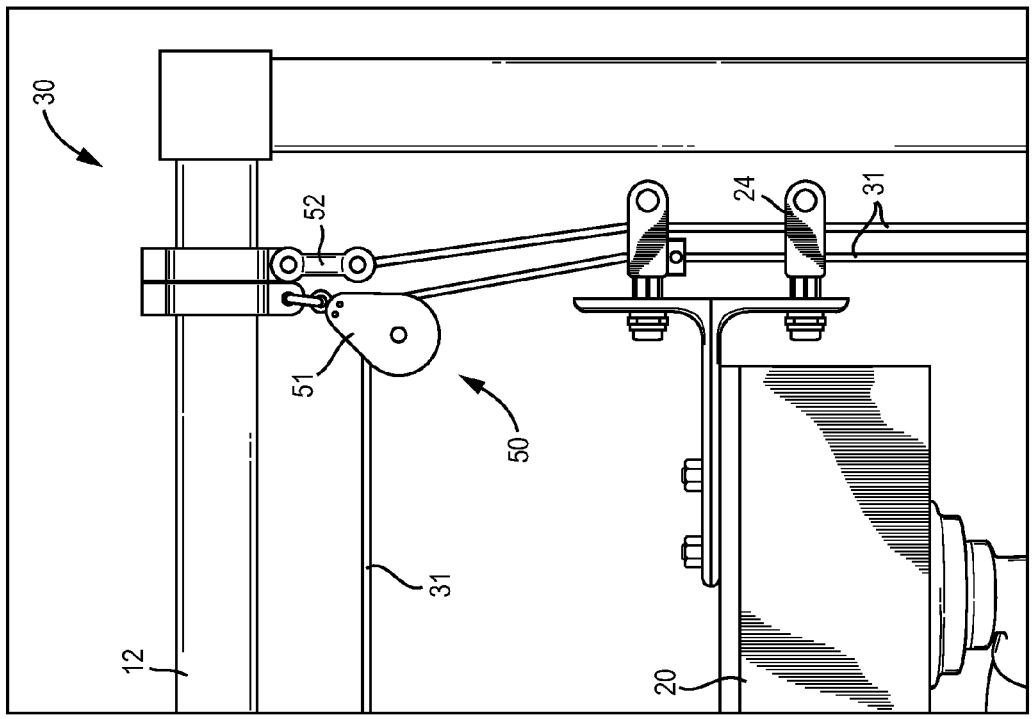

FIGS. 7 and 8 illustrate a drive train in the form of a pulley system (50) for use in raising and lowering trays (20) in an embodiment of a tray suspension system (30). The guide wires (31) of the tray suspension system are threaded into the pulley system, and the lifting cables are combined after the outermost pulley (51) and fed into an automated winch (not illustrated). For smaller systems, a non-automated lifting handle or other means can be used to move the vertical position of the trays. The pulley system is affixed to the top of the greenhouse support frame (12). The pulleys can be moveably affixed to the tray suspension system to allow for facile repositioning. The guide wires are also tensioned with a turnbuckle (52) at the top of the pulley system to limit migration or wobble of the trays. The double clevis attachments (24) on the trays assist in minimizing tray wobble.

The trays (20) in FIGS. 7 and 8 are arranged in two separate vertical rows (more fully illustrated in FIGS. 9 and 10), and each vertical row of trays is driven by a separate pulley system (50). In other embodiments, one pulley system is used to drive a plurality of vertical rows of trays. In alternative embodiments, a plurality of pulley systems can be used to drive a single vertical row of trays. In the two vertical row embodiment of the invention, separate systems allow for independent adjustment of the positions of each vertical row of trays. For example, a front or rear set of trays can be raised or lowered to allow for Venetian blind adjustment of the trays for optimization of illumination of the trays as discussed for FIG. 2.

Figure 9:
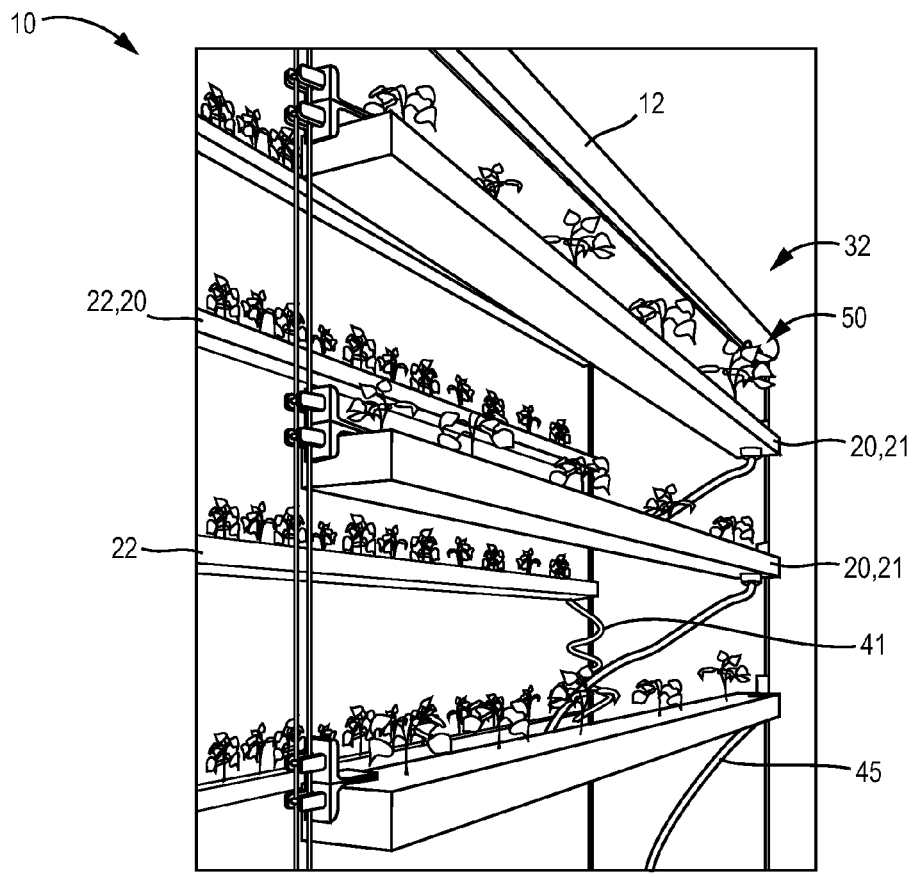
FIGS. 9 and 10 illustrate embodiments of the invention wherein the tray suspension system is a plant cable lift system, and the trays are arranged in two parallel vertical rows, and excess water flow from an outlet in an upper tray into the inlet of a lower tray.
Figure 10:
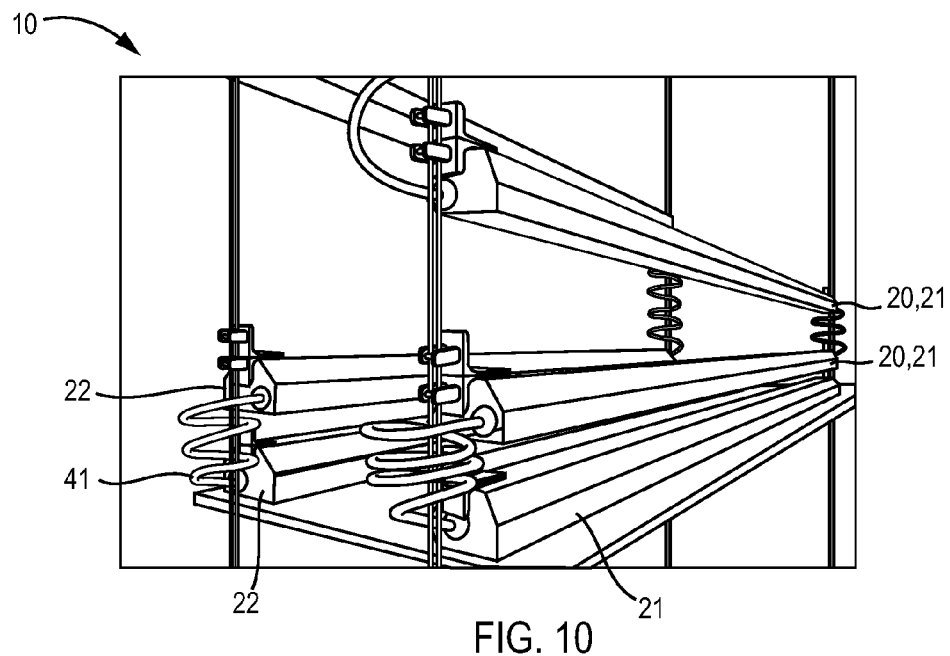

FIGS. 9 and 10 illustrate multiple trays (20) which are interconnected in a plant cable lift system (32) embodiment of the invention. The trays are arranged in two parallel vertical rows in which there are front trays (21) and rear trays (22). Each vertical row of trays has a separate pulley drive train system (50) at the top of the tray suspension system. In FIG. 9, the front trays are a different size than the rear trays, demonstrating that the gardener may use more than one kind of tray simultaneously in the greenhouse. The greenhouse (10) comprises a support frame (12) having structural supports at the top and bottom, and the pulley system has been fastened to the structural supports at top of the greenhouse.

The trays are interconnected and spaced approximately 15 inches apart to allow for plant growth. In FIG. 9, the trays (22) in the rear row are seedling trays having closer plant hole penetrations. That is, these trays (22) have closer plant spacing as compared to the front trays (21).

These lower trays can be "collapsed" to allow for greater use of the vertical space by placing the trays closely together, as seen at the bottom of the greenhouse illustrated in FIG. 10. In FIG. 10, the trays are interconnected via coiled self-retracting drainage hoses (41), as are the rear row of trays (22) in FIG. 9. These trays have alternating downward sloping grades for water drainage, and excess water flows down the vertical coiled hoses to enter the immediately lower tray.

In contrast, the front set of trays (21) in FIG. 9 all have the same downward grade, and excess water exits from one tray into a drainage hose (45) which extends approximately the length of the tray. The drainage hose crosses the length of the tray and enters the water inlet at the opposite side of the tray from the water outlet of the upper level tray. Accordingly, the front set of trays (21) slope gently from the left side of the tray (the location of the water inlet) down to the right side of the tray (the location of the water outlet).

In both sets of trays (21, 22), the plants are watered in series as water moved down from higher trays down to lower trays before draining into the reservoir for recirculation. FIG. 9 illustrates that multiple embodiments of the water distribution system are possible in a single greenhouse.

FIG. 11 illustrates a schematic view of a second embodiment of inventive greenhouse (10), wherein the drive train of the tray suspension system (30) is in the form of a conveyor system (70). The conveyor system vertically conveys each tray (20) in a circular path through the greenhouse. In this embodiment of the invention, one end of the trays (20) is fastened to a hollow pin drive chain (71), and the other end of the tray is free and unrestricted.

The conveyor system (70) comprises a plurality of cogs (72) over which travels over the hollow pin chain (71). The trays are fastened to the hollow pin chain. In the illustrated embodiment, the drive train consists of three cogs (72) located at the top of the conveyor system and three cogs (72) located at the bottom of the conveyor system. A motor (shown schematically as element (73)) located at the bottom of the conveyor system turns the cogs and causes the hollow pin chain (71) to travel.

The upper cogs are attached to three arms (74), and the lower cogs are also attached to three arms (74). These arms can be affixed to an upper or lower portion of the tray suspension system or to a support frame (not illustrated) in which the greenhouse has been erected, as appropriate. In alternative embodiments, there may be additional or fewer cogs over which the drive chain travels.

In alternative embodiments, the drive chain (71) is moved manually to adjust the positions of the tray. In such embodiments, the cogs and drive chain can be designed to be moved easily to avoid excess exertion.

The water distribution system in FIG. 11 comprises a water reservoir (40) at the bottom of the greenhouse (10). Water is pumped from the bottom reservoir via a pump (46) to a circular header loop hose (47) which is fastened to the drive chain (71). The header loop hose rotates in unison with the drive chain and the trays. Water is supplied to the loop hose via a header loop hose extension arm (48). The extension arm is placed in a guide arm (75) which clears the cog assembly, and the extension arm has swivel joints to prevent kinking.

In this embodiment, the trays (20) are all watered in parallel as each of the trays has its own water distribution tube or inlet line (such as a punch style drip supply hose) to serve as the water inlet to the tray. The water distribution tubes comprise swivel joints and are all designed to prevent tangling or kinking as the trays are rotated within the conveyor system. Water is recirculated within this embodiment of the greenhouse, although in other embodiments, consistent with the invention, excess water exiting the trays may be channeled to a drain. Individual water distribution tubes may be clipped or fastened to the chain drive or trays to prevent kinking or as deemed suitable. The illustrated water distribution system is further discussed in FIG. 12.

FIG. 12 illustrates a side view of a single tray portion of the conveyor system of FIG. 11 and shows the attachment of a tray (20) and water inlet line (49) to the chain. For clarity of illustration, the tray (20) has been drawn schematically using a dashed-dotted line. L-shaped brackets (23) are affixed to the trays, as discussed above with respect to the embodiment of FIGS. 3-10. However, instead of clevis fittings previously discussed, the brackets in FIG. 12 have a free-pivoting hanger connection (76) attached to a free-pivoting hollow pin chain throughbolt (77). This pin or throughbolt is attached to a hollow pin chain link of the chain (71) which drives the system. The link and pin assembly (23, 76, 77) has springs to maintain tension so that the trays can be removed from the chain without the trays slipping out. The trays can be removed from the chain by unbolting the hanging pin at either end of the chain, or at tray bracket points. The link and pin assembly (23, 76, 77) forms a free-pivoting hanger connection allowing the trays to swivel as they move through the conveyor system (70).

The header loop hose (47) may be fastened to the drive chain (71) via loop straps (79) and single pitch adding links (80), and the header loop hose rotates in unison with the drive chain. All of these parts are available commercially from various vendors such as McMaster-Carr, Elmhurst, Ill.

The hanging pin assembly (23, 76, 77) is shaped to permit it to maneuver around the baffling and cogs during rotation. The hanging pin is fixed in position to the drive chain, but is not fixed at its opposite end, termed the gutter bracket point. As the trays move within the conveyor system (70), the trays (20) pivot at the gutter bracket point but remain in an upright position to permit plants to grow vertically. The chain may optionally have flexible circles or other structures mounted thereon to provide a degree of spring or bounce to the trays, to assist in maintaining the trays in position, or to discourage water from splashing onto the drive chain. Water may enter the trays via a punch style drip supply hose (49) which has a swivel connection (81) to prevent kinking during travel. Alternatively, water may enter the tray via another kind of watering means.

The trays may also be fitted with optical sensors to adjust the water levels in the trays. For example, the optical sensor may be operationally connected to a switch which controls the flow of water into or out of the trays. When the optical sensor detects that a water level in a particular tray is too low, the sensor can activate the water inlet, opening up a valve and thereby causing water to enter the tray. Similarly, when the optical sensor detects that the water level is too high, the sensor can open a water outlet valve to cause water to drain from the tray. Optical or other kinds of sensors can also be used as deemed suitable by the gardener or user.

In one embodiment, the chain drive is located on or embedded in a gutter on the water inlet or upslope side of the tray. In other embodiments, the drive chain is embedded in a gutter on the drain or downslope side of the tray. A vertical gutter may be used to channel water exiting from the tray and flowing into the water reservoir. The vertical gutter may have baffling to allow for water containment and channeling without exposing the chain to water.

Figure 13:
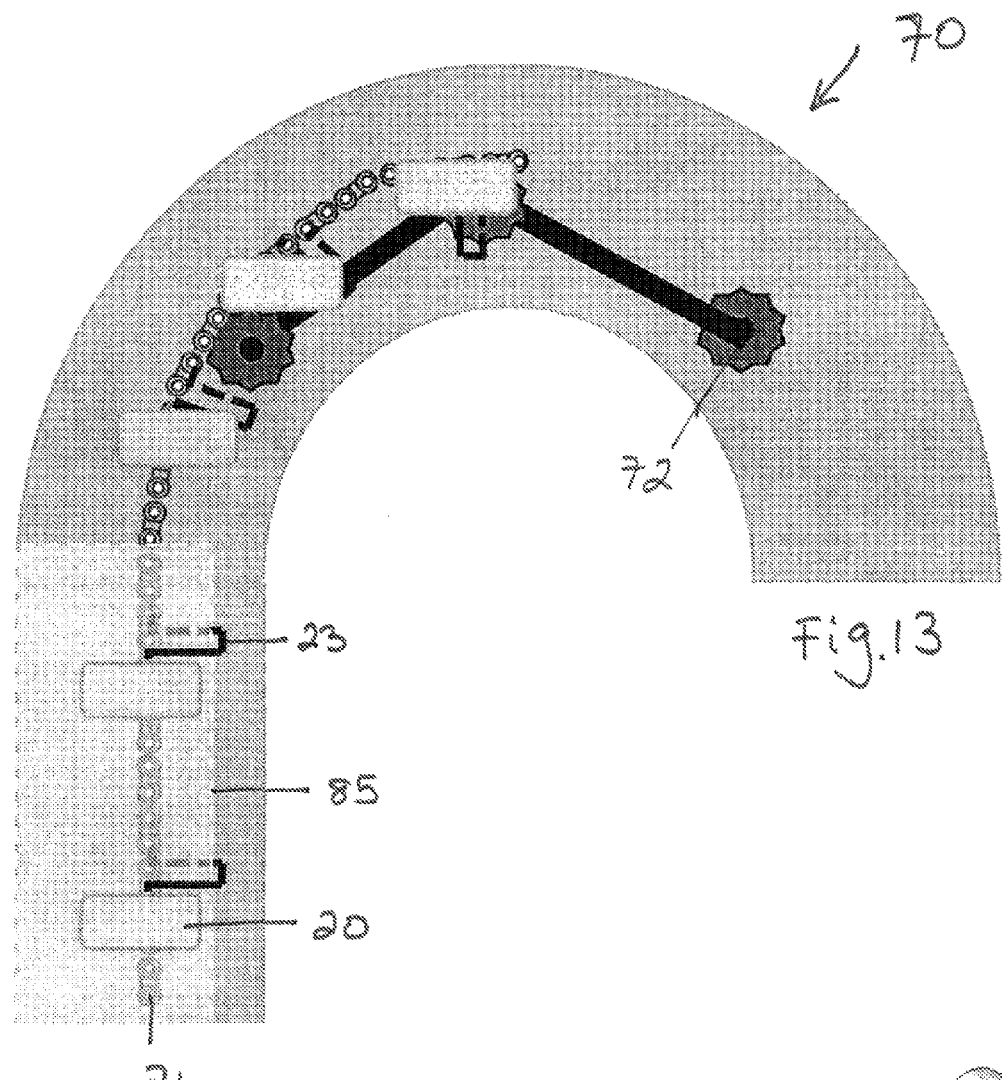
FIG. 13 illustrates the top portion of the conveyer system of FIG. 11, wherein the trays are fastened to a chain, and a plurality of cogs are used to move the chain and the trays through various positions of the greenhouse.

FIG. 13 illustrates a partial cross-sectional view of the top portion of the conveyor system (70) of FIG. 11 with more specificity. The trays (20) are fastened to the drive chain (71) via the L-shaped bracket (23), and a plurality of cogs (72) are used to move the chain and the trays through various positions of the greenhouse. The plurality of cogs maintain the shape of the drive chain and enable circuitous movement of the drive chain. An internal gutter baffling in combination with a drive chain cover (85) may be used to prevent water from spilling upon or falling upon the drive chain. The trays pivot about their respective hanging pin as they move through the conveyor, thereby remaining in a horizontal and upright position.

The dashed lines in FIG. 13 indicate the position of a covering or enclosure (85) for the drive chain assembly. Such an enclosure increases the safety of the conveyor system (70) by reducing the chances that individuals or stray objects may get caught in the chain. The enclosure also reduces the chances that water may splash into the chain drive and cause rusting or deterioration of its components. By hiding the chain drive (71) within the enclosure (85), the aesthetics of the greenhouse is also improved and noise levels decreased.

Figure 14:
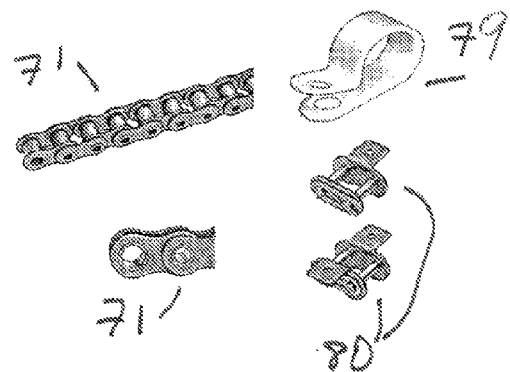
FIG. 14 illustrates a close-up views of a number of components shown schematically in FIG. 12.

FIG. 14 illustrates close-up views of the hollow pin chain (71), hose loop strap (79), and single pitch adding link (80)

discussed earlier. These items are commercially available from McMaster-Carr, Elmhurst, Ill.

Figure 15:
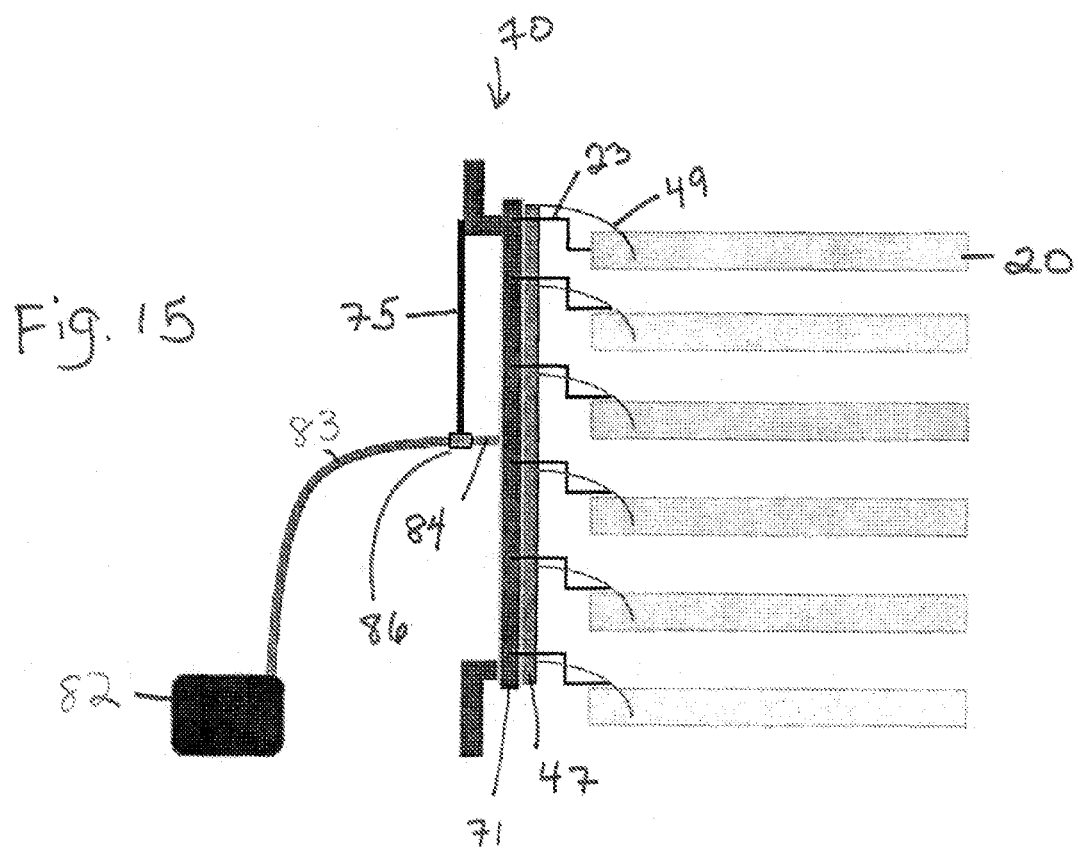
FIG. 15 illustrates the front left portion of the embodiment of FIG. 11, wherein the trays are mounted to the conveyor system, and water distribution system provides water to each tray simultaneously.
Figure 16:
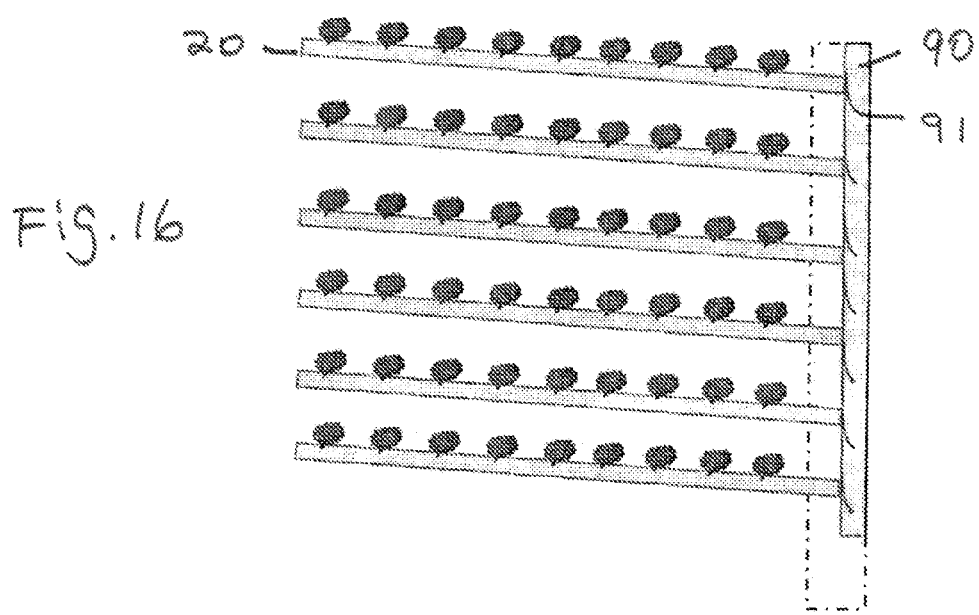
FIG. 16 illustrates a schematic view showing drainage of excess water from the embodiment illustrated in FIG. 11, in which the trays have a downward slope and excess water from the trays drains into a return gutter.

FIG. 15 illustrates a schematic cross-sectional view of the front left portion of the embodiment of FIG. 11, wherein the trays (20) are mounted to the conveyor system (70) via an L-shaped bracket (23), and the water distribution system provides water to each tray simultaneously. The water distribution system comprises a header loop hose (47) located adjacent to the drive chain (71). The header loop hose is fastened to the drive chain via loop straps (FIG. 14, element (79)) and single pitch adding links (FIG. 14, element (80)), and the header loop hose rotates in unison with the drive chain. Cog hanger arms (FIG. 11) support the weight of the system.

A non-tangle hose spool (82) is located at the bottom of the tray suspension system near the reservoir (not illustrated). The water supply tube comprises the hose spool (82) which feeds water to a feeder hose (83). The feeder hose is offset with an extension connection (84) to the header loop hose (47). This arrangement serves to keep the hoses and tubing clear from the drive chain and cog assemblies. The hoses and tubing are connected via swivel joints (86) to prevent kinking and tangling. The feeder hose is located in a hose guide arm (75) in order to keep it centered and unkinked.

FIG. 18 illustrates a schematic view of the embodiment in FIG. 11, in which the trays have a downward slope and excess water from the trays drains into a return gutter (90) located at the side of the tray (20) which is opposite to the tray suspension bracket. The return gutter has a ¾ channel which guides the tray as it moves in the conveyor system. Cutout downspouts (91) in the gutter receive falling water and guide it in the gutter tube. The edges of the track in the gutter nevertheless hold the tray in place. In other embodiments, the return gutter (90) may have flexible bellows affixed thereon which expand and collapse to encourage water to flow down and out into the gutter. Excess water flows into the return gutter, and then travels down into the reservoir for recirculation.

Numerous modifications and variations of embodiments of the present invention are possible in light of the above teachings, and therefore, within the scope of the appended claims, the invention may be practiced otherwise than as particularly described.

What is claimed is:

1. A vertical growing system for cultivation of plants, the system comprising:
   (a) a plurality of trays structurally configured for growing plants therein;
   (b) a tray suspension system to which the trays are adjustably affixed one above another, wherein:
      (i) the tray suspension system comprises a drive system, means for adjustment of the vertical position of the trays to the drive system, and a plant cable lift system which provides adjustable vertical raising and lowering of individual trays or sets of trays, and has a singular access point for user access and manipulation of the trays;
      (ii) the spacing between the trays in the suspension system is adjustable to vary the amount of light passing through the tray suspension system to surfaces behind the tray suspension system; and
      (ii) the tray suspension system is configured to allow natural lighting to pass to the plants growing in the trays; and
   (c) a water distribution system comprising a reservoir, a pump, and a water supply tube, the water distribution system providing a flow of irrigation water to the plants growing in the trays, and drainage of excess water from the trays.

2. The growing system according to claim 1, wherein the trays are structurally configured for growing plants hydroponically, via a nutrient film technique, or in a solid growing medium.

3. The growing system according to claim 1, wherein the trays are spaced between about 10-30 inches apart in the suspension system during a growing cycle.

4. The growing system according to claim 1, wherein the trays have respective inlets and outlets, and the water distribution system provides water to an inlet of a upper tray and water exiting through an outlet of the uper the tray flows via gravity to an inlet of a lower tray.

5. The growing system according to claim 1, wherein the tray suspension system comprises means for tracking solar elevation for optimizing the amount of light provided to the trays.

6. The growing system according to claim 5, wherein the trays in the tray suspension system are arranged in a front row and a rear row; and the front and rear rows of trays are staggered and vertically adjustable relative to each other to optimize the amount of light passing to or through the trays.

7. The growing system according to claim 1, wherein the tray suspension system comprises motorized or manual means for adjusting the position of the trays.

8. The growing system according to claim 1, wherein the suspension system comprises automated means for adjusting the position of the trays.

9. A vertical growing system for cultivation of plants, the system comprising:
   (a) a plurality of trays structurally configured for growing plants therein;
   (b) a tray suspension system to which the trays are adjustably affixed one above another, wherein:
      (i) the tray suspension system comprises a drive system, means for adjustment of the vertical position of the trays to the drive system, and has a singular access point for user access and manipulation of the trays;
      (ii) the spacing between the trays in the suspension system is adjustable to vary the amount of light passing through the tray suspension system to surfaces behind the tray suspension system; and
      (ii) the tray suspension system is configured to allow natural lighting to pass to the plants growing in the trays; and
   (c) a water distribution system comprising a reservoir, a pump, and a water supply tube, the water distribution system providing a flow of irrigation water to the plants growing in the trays, and drainage of excess water from the trays; and
   wherein the trays have respective inlets and outlets and are interconnected by one or more water distribution tube(s), and wherein the water distribution system provides water to an inlet of an upper tray, and water exiting through an outlet of the upper tray flows via gravity to an inlet of a lower tray.

10. The growing system according to claim 9, wherein the trays have a grade in the range of about 0.5-2 inches over 5 feet, or in the range of from 0.05° to 0.1°.

11. The growing system according to claim 9, wherein the water distribution system further provides plant nutrients to the trays.

12. The growing system according to claim 9, wherein the water distribution system is configured for recirculation of the irrigation water within the growing system.

13. A vertical growing system for cultivation of plants, the system comprising:

(a) a plurality of trays structurally configured for growing plants therein;
(b) a tray suspension system to which the trays are adjustably affixed one above another, wherein:
  (i) the tray suspension system comprises a drive system, means for adjustment of the vertical position of the trays to the drive system, and has a singular access point for user access and manipulation of the trays;
  (ii) the spacing between the trays in the suspension system is adjustable to vary the amount of light passing through the tray suspension system to surfaces behind the tray suspension system; and
  (ii) the tray suspension system is configured to allow natural lighting to pass to the plants growing in the trays; and
(c) a water distribution system comprising a reservoir, a pump, and a water supply tube, the water distribution system providing a flow of irrigation water to the plants growing in the trays, and drainage of excess water from the trays; and
wherein the suspension system comprises a pulley assembly, a set of suspension wires for spatial alignment of the trays, and a set of lifting wires for vertical positioning of the trays.

14. The growing system according to claim 13, wherein the tray suspension system comprises a conveyor system which vertically conveys each tray through the growing system while maintaining a substantially static spacing between trays.

15. The growing system according to claim 14, wherein the water distribution system is mechanically independent of the conveyor system.

16. The growing system according to claim 13, wherein the trays are affixed to the suspension system via a releasable L-shaped bracket.

17. The growing system according to claim 13, wherein the water distribution system irrigates the trays simultaneously, sequentially, or a combination of both.

18. The growing system according to claim 13, wherein the growing system is structurally configured for mounting in an atrium.

19. The growing system according to claim 13, wherein the growing system is structurally configured for mounting to a façade of a building.

20. The growing system of claim 13, wherein the plant cable lift system enables collapsing of the trays on top of one another.

* * * * *